R. L. SLONAKER.
GLASS FOR HEADLIGHTS.
APPLICATION FILED AUG. 5, 1915.

1,244,556.

Patented Oct. 30, 1917.

WITNESSES
W. F. Rodgers
W. F. Keefer.

INVENTOR
Robert L. Slonaker.
H. E. Dunlap
ATTORNEYS

UNITED STATES PATENT OFFICE.

ROBERT L. SLONAKER, OF WHEELING, WEST VIRGINIA.

GLASS FOR HEADLIGHTS.

1,244,556.  Specification of Letters Patent.  Patented Oct. 30, 1917.

Application filed August 5, 1915. Serial No. 43,733.

*To all whom it may concern:*

Be it known that I, ROBERT L. SLONAKER, a citizen of the United States of America, and resident of Wheeling, county of Ohio, and State of West Virginia, have invented certain new and useful Improvements in Glasses for Headlights, of which the following is a specification.

This invention relates to glass faces for headlight lamps, and it has for its primary object to provide a headlight glass for automobiles, trolley cars and the like, which, while transmissive of and directing light in a forward direction for illuminating the roadway, effectually eliminates the objectionable blinding glare of such headlights.

A further object of the invention is to provide a device of the character mentioned by means of which a greater amount of light is directed laterally of the front of the car than is done by the ordinary clear glass— that is, an area of increased width close to the front of the car is illuminated.

With these and other objects in view, the invention resides in the features of construction which will hereinafter be fully described, reference being had to the accompanying drawings, forming a part of this specification, in which—

The device consists of a single piece of glass of circular form having an annular flange 1 for fitting in a lamp in the usual manner. Located inwardly from and adjacent to said flange is a rim 2 which may be in the form of a forwardly facing bead, as shown.

Figure 1:
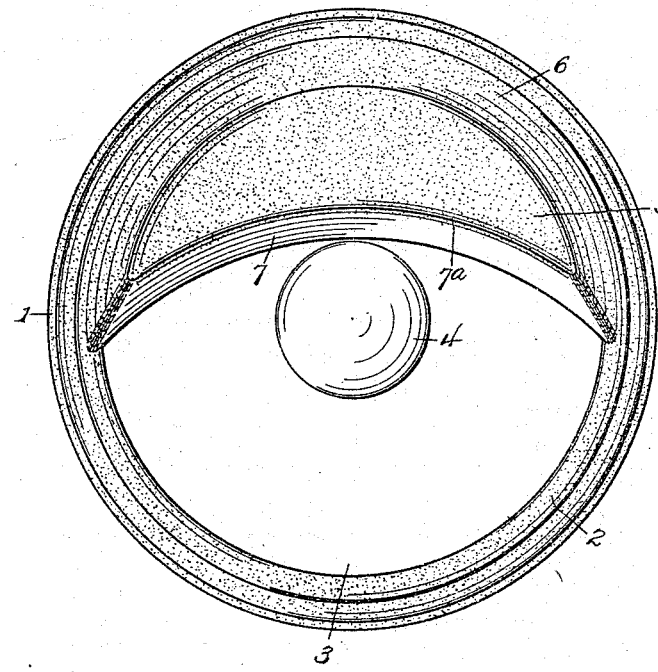
Figure 1 is a front elevation of the invention.
Figure 2:
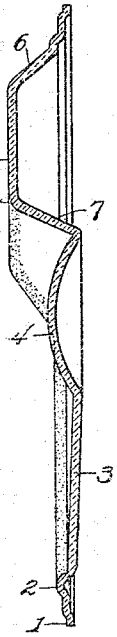
Fig. 2 is a central vertical section of the same; and—
Figure 3:
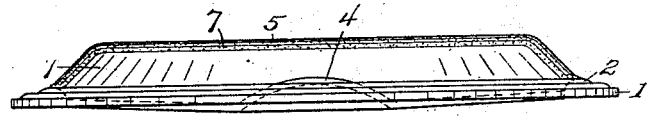
Fig. 3 is an edge view of the same as seen looking upward from the lower edge.

The main body or lower central light transmissive portion 3 of the device is made of clear transparent glass and is substantially flat in form. Said portion may present a true flat surface, but is preferably made slightly concave in form, as shown in Figs. 2 and 3, for the purpose of slightly converging the light rays transmitted therethrough. Formed in the center of the device, or at the upper part of said main body portion, is a circular convex surface, or bull's-eye, 4 of suitable size designed to concentrate light rays and project the same forward for brightly illuminating the roadway at a considerable distance in advance of the car. The upper portion of the glass is dished outward forming a protuberant portion of crescent shape. The face 5 of said crescent-shaped portion is flat and is bounded by a semi-circular inwardly and forwardly inclined wall 6 and by an arched downwardly and rearwardly inclined wall 7, the latter overhanging the bull's-eye 4 in the manner of a brow.

The protuberant portion or crescent is rendered translucent by sand-blasting, etching, painting or other well-known means employed in the art of glass-making, thus causing the light transmitted therethrough to be diffused and preventing the free transmission of those forwardly and upwardly directed rays of light which in the ordinary form of clear glass lamps prove so objectionable to pedestrians and others approaching or approached by the lights. The sand blasted portion includes the curved edge 7$^a$, provision thus being made for breaking up the brilliant beams of light which would otherwise pass therethrough. The arched wall 7 is of clear transparent glass, permitting rays of light reflected from the top of the lamp to unobstructedly pass downward therethrough for illuminating the roadway close to the car. The said wall 7 has its ends located laterally with respect to the middle portion of the glass and, consequently, permits of light being reflected therethrough in a lateral direction, or toward the sides of the roadway.

The entire encircling rim 2 is also rendered translucent in the manner hereinbefore described for preventing the unobstructed transmission of glaring beams of light reflected from the outer portion of the lamp reflector.

From the foregoing it will be noted that the bull's-eye 4 and lower central portion 3 are the only portions through which the light rays pass unobstructedly in a forward direction, and that while said portions permit the passage of light which will brilliantly illumine the roadway, the frosted or translucent portions prevent the passage of bright glaring gleams. Further, the reflected rays transmitted downward and laterally through the arched wall 7 cross the rays transmitted through the bull's-eye 4 and lower central portion 3 in such a way as to deaden the brilliancy of the latter to an extent which effectually eliminates the objectionable dazzling or blinding glare.

It will be apparent that the lateral illumination of the roadway close to the car would be much the same if the glass were disposed in the headlight in a reversed, or up-side-down, position, as in such case the light transmitted through the concavo-convex inclined wall 6, which may be either frosted or plain, would afford such lateral illumination. In such case, however, the body portion 3, or a substantial portion thereof, should be frosted to eliminate the glare, due to the fact that in the reversed position said body portion is uppermost.

What is claimed is—

1. A glass face for headlights having its upper portion dished forward to overhang the main body portion thereof and to form an arch-like wall, said body portion being transparent and said dished portion translucent.

2. A glass face for headlights having an upper forwardly dished protuberant portion of substantially crescent shape, the lower wall of said portion constituting an arch which overhangs the main body portion, said main body portion and said arch being transparent and said protuberant portion being translucent.

3. A glass face for headlights having an upper forwardly-protuberant portion of substantially crescent shape, and a main body portion having a bull's-eye formed therein.

4. A glass face for headlights comprising a main body portion and an upper forwardly protuberant portion, the lower wall of said protuberant portion being of arched form and overhanging the main body portion, the face of said protuberant portion being translucent and a portion of said main body portion and said arched wall being transparent.

5. A glass face for headlights comprising a main body portion and an upper forwardly protuberant portion, the lower wall of said protuberant portion being of arched form and overhanging the main body portion, the face of said protuberant portion being translucent and said arched wall being transparent, and a translucent rim encircling said portions.

6. A glass face for headlights comprising a substantially flat main body portion, a bull's-eye formed centrally of said face and located in the upper part of said main body portion, a protuberant portion the lower wall of which overhangs said bull's-eye, said bull's-eye and said overhanging wall being transparent, and said protuberant portion being translucent, and a rim encircling said portions.

7. A glass for headlights having a central light-projecting lens and having the upper portion thereof dished forward to form an arch which overhangs said lens, the face of the dished portion being translucent and transmissive of diffused light rays only.

8. A glass for headlights having a central light-projecting lens and having the upper portion thereof dished forward to form an arch which overhangs said lens, the lens and the arch being transparent, and that portion of the glass above said arch being translucent.

9. A glass for headlights having a central light-projecting lens and having the upper portion thereof dished forward to form an arch which overhangs said lens, the lens and the arch being transparent and the most advanced part of said dished portion being translucent.

10. A glass face for headlights having its upper portion dished forward beyond the plane of the main body portion thereof and forming an arch which overhangs said main body portion, the face of the most advanced part of said dished portion being flat, and a light-directing lens formed in said main body portion.

11. A glass face for headlights comprising a main body portion and a forwardly protuberant portion having a flat surface in a plane parallel to that of said main body portion, the lower wall of said protuberant portion forming an inclined arch which overhangs the main body portion.

12. A glass face for headlights comprising a substantially flat portion, a forwardly protuberant portion, and a lens disposed in a substantially central position, said lens rising from said flat portion adjacent to said protuberant portion.

13. A glass for headlights having a seating rim, a centrally disposed lens, and a portion intermediate said rim and said lens projected forward in advance of the plane of said rim, the lower wall of said projected portion being curved and adapted to transmit light in downward and lateral directions, said projecting portion having a face adapted to transmit light in a forward direction.

14. A glass for headlights having a seating rim, a frosted portion located inward with respect to said rim projected forward in advance of the plane of the latter and having a substantially flat face for transmitting light in a forward direction, the lower wall of said projecting portion being transparent and having a curved contour.

15. A glass for headlights having a seating rim, a centrally disposed lens, and a portion intermediate said rim and said lens projected forward in advance of the plane of said rim, the face of said projecting portion being translucent and adapted to transmit diffused light rays only, the lower wall of said projecting portion being transparent.

16. A glass for headlights having a seating rim, a centrally disposed lens, and a portion intermediate said rim and said lens projected forward in advance of the plane of said rim, the face of said projecting portion being translucent and adapted to transmit diffused light rays only.

17. A glass for headlights comprising a seating rim, a forwardly projecting portion located inward with respect to said rim and having a translucent face, the outer wall of said projecting portion being axially curved and inwardly and forwardly inclined, and a circular lens disposed inward with respect to said projecting portion and coaxial with respect to said rim.

18. A glass for headlights comprising an outer seating rim, a centrally disposed lens, and an intermediate forwardly protuberant portion the outer wall of which is inwardly and forwardly inclined and has a curved contour, the face of said protuberant portion being translucent.

19. A glass for headlights comprising a rim, a transparent central portion in substantially the same plane as said rim, the portion between said rim and said central portion being extended forward above said central portion to form a flat surface, a shoulder above said surface and a shoulder below said surface, said surface and first named shoulder being translucent, and said second-named shoulder being transparent and projecting forwardly beyond said central portion.

20. A glass for headlights comprising a flat translucent portion of substantial area, and a transparent central portion disposed inwardly with respect to the plane of said flat portion and connected thereto by a shoulder, the portion of said shoulder projecting above said central portion being transparent.

In testimony whereof, I affix my signature in presence of two subscribing witnesses.

ROBERT L. SLONAKER.

Witnesses:
H. E. DUNLAP,
W. F. KEEFER.